United States Patent
Donovan et al.

(10) Patent No.: US 8,619,739 B1
(45) Date of Patent: *Dec. 31, 2013

(54) BLUETOOTH COEXISTENCE TIMING SYNCHRONIZATION

(75) Inventors: Timothy J. Donovan, Livermore, CA (US); Partho Mishra, Cupertino, CA (US); Ken Kinwah Ho, San Jose, CA (US); Chia-Chun Chung, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/544,438

(22) Filed: Jul. 9, 2012

Related U.S. Application Data

(63) Continuation of application No. 12/844,859, filed on Jul. 28, 2010, now Pat. No. 8,218,516, which is a continuation of application No. 11/438,918, filed on May 23, 2006, now Pat. No. 7,768,981.

(60) Provisional application No. 60/690,600, filed on Jun. 14, 2005.

(51) Int. Cl.
*H04W 4/00* (2009.01)

(52) U.S. Cl.
USPC ........... 370/338; 370/329; 370/230; 370/394; 370/331; 370/349; 455/432.1; 455/560; 455/414.1; 455/561; 455/512

(58) Field of Classification Search
USPC ......... 370/338, 394, 328–329, 230, 331, 349; 455/419, 420, 432.1, 560–561, 512, 455/414.1
See application file for complete search history.

(56) References Cited

U.S. PATENT DOCUMENTS

| | | | |
|---|---|---|---|
| 4,862,485 A | 8/1989 | Guinea et al. | |
| 5,870,381 A | 2/1999 | Kawasaki et al. | |
| 6,947,768 B2 * | 9/2005 | Adachi et al. | 455/560 |
| 7,151,945 B2 | 12/2006 | Myles et al. | |
| 7,388,857 B2 | 6/2008 | Sharma | |
| 7,447,184 B1 | 11/2008 | Kharvandikar et al. | |
| 7,522,564 B2 * | 4/2009 | Kakumaru et al. | 370/338 |
| 7,567,544 B2 | 7/2009 | Myles et al. | |
| 7,567,815 B2 | 7/2009 | Nishikawa et al. | |
| 7,715,337 B2 | 5/2010 | Watanabe et al. | |
| 2005/0018624 A1 | 1/2005 | Meier et al. | |
| 2005/0208966 A1 | 9/2005 | David et al. | |
| 2006/0217076 A1 | 9/2006 | Bishop | |
| 2006/0239223 A1 | 10/2006 | Sherman et al. | |
| 2006/0274704 A1 * | 12/2006 | Desai et al. | 370/338 |

OTHER PUBLICATIONS 802.11n; IEEE P802.11-04/0889r6; Wireless LANs, TGn Sync Proposal Technical Specification; 131 pages.

(Continued)

*Primary Examiner* — Kiet Doan
*Assistant Examiner* — Michael T Vu

(57) ABSTRACT

A wireless network device comprises a first wireless communication device that includes a first radio frequency (RF) transceiver that generates a synchronization pulse and that transmits and receives data according to a first period. A second wireless communication device receives a signal indicative of the synchronization pulse and includes a second RF transceiver that transmits and receives data according to a second period. The second period is not equal to the first period and the second wireless communication device adjusts the second period according to the first period and the synchronization pulse.

16 Claims, 12 Drawing Sheets

(56) References Cited

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.

IEEE 802.20-PD-06, IEEE P 802.20 V14, Jul. 16, 2004, Draft 802.20 Permanent Document, System Requirements for IEEE 802.20 Mobile Broadband Wireless Access Systems—Version 14, 24 pages.

IEEE Std 802.11a-1999 (Supplement to IEEE Std 802.11-1999) [Adopted by ISO/IEC and redesignated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11g/D2.8, May 2002 (Supplement to ANSI/IEEE Std 802.11, 1999 Edition) Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band; LAN/MAN Standards Committee of the IEEE Computer Society; 53 pages.

IEEE Std 802.11h-2003 (Amendment to IEEE Std 802.11, 1999 Edition (Reaff 2003)); as amended by IEEE Stds 802.11a-1999, 802.11b-1999, 802.11b-1999/Cor 1-2001, 802.11d-2001, and 802.11g-2003; IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 5: Spectrum and Transmit Power Management Extensions in the 5 GHz band in Europe; IEEE Computer Society LAN/MAN Standards Committee; Oct. 14, 2003; 74 pages.

IEEE Std 802.15.1-2002; IEEE Standard for Information technology—Telecommunications and information exchange between systems—Local and metropolitan area networks—Specific requirements—Part 15.1: Wireless Medium Access Control (MAC) and Physical Layer (PHY) Specifications for Wireless Personal Area Networks (WPANs); IEEE Computer Society, LAN/MAN Standards Committee; Jun. 14, 2002; 1169 pages.

IEEE Std 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

\* cited by examiner

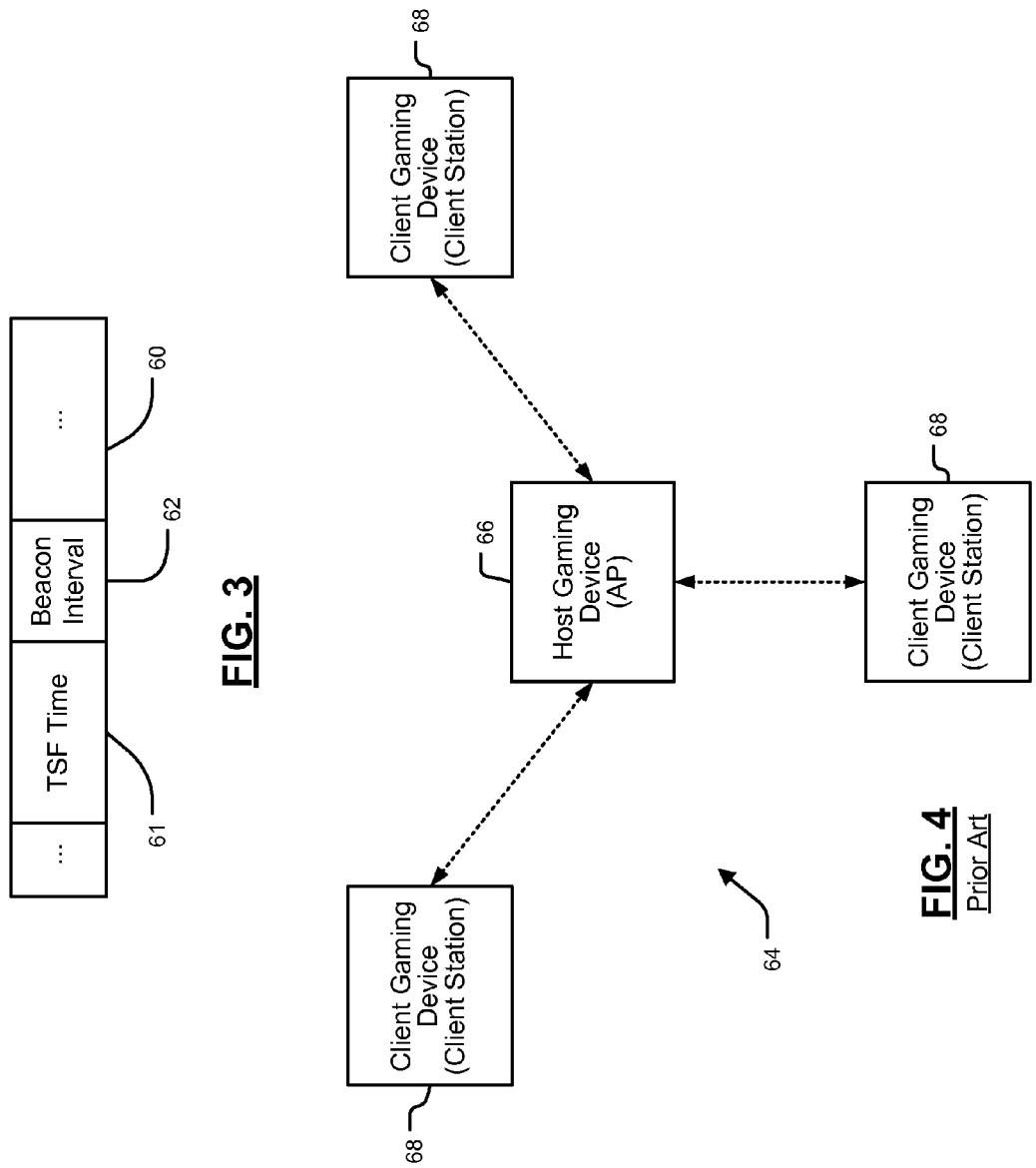

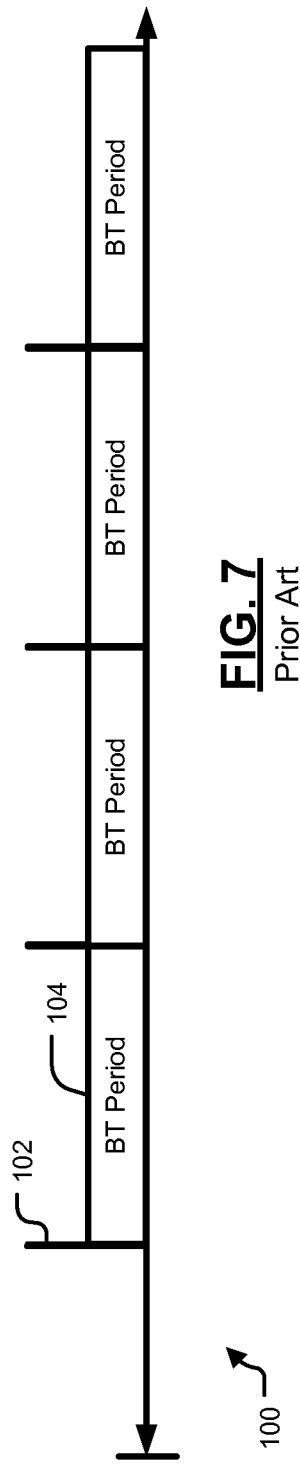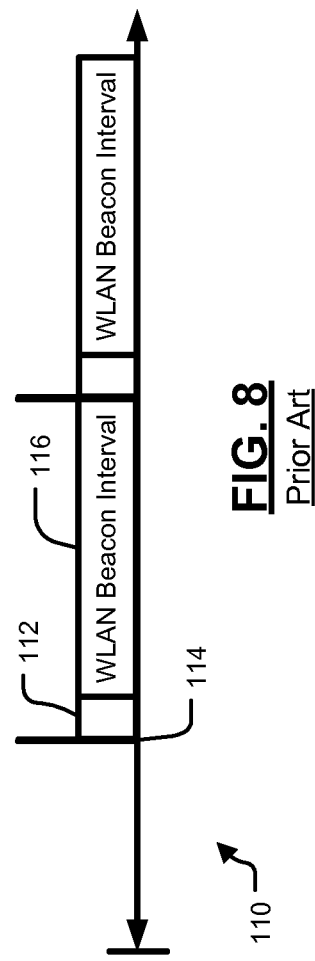

BLUETOOTH COEXISTENCE TIMING SYNCHRONIZATION

CROSS-REFERENCE TO RELATED APPLICATIONS

This application is a continuation of U.S. patent application Ser. No. 12/844,859 (now U.S. Pat. No. 8,218,516), filed on Jul. 28, 2010, which is a continuation of U.S. patent application Ser. No. 11/438,918 (now U.S. Pat. No. 7,768,981), filed May 23, 2006, which claims the benefit of U.S. Provisional Application No. 60/690,600, filed Jun. 14, 2005. The disclosures of the above applications are incorporated herein by reference in their entirety.

FIELD OF THE INVENTION

The present invention relates to wireless networks, and more particularly to synchronizing a wireless local area network (WLAN) device with a Bluetooth device.

BACKGROUND OF THE INVENTION

There are several different IEEE standards for configuring wireless networks and devices. For example, IEEE standards that have been popularized include 802.11, 802.11a, 802.11b, 802.11g, 802.11h, and 802.11n, 802.16, and 802.20, which are hereby incorporated by reference in their entirety. According to these standards, wireless network devices may be operated in either an infrastructure mode or an ad-hoc mode.

In the infrastructure mode, the wireless network devices or client stations communicate with each other through an access point (AP). Referring now to FIG. 1, a wireless network 10 that operates in the infrastructure mode includes an AP and at least one client station that communicates with the AP. The first wireless network 10 includes one or more client stations 12-1, 12-2, . . . , and 12-N (collectively referred to as client stations 12) and one or more APs 14. The client stations 12 and the AP 14 transmit and receive wireless signals 16 over an RF channel. The AP 14 may be connected to a distributed communications system 18 such as the Internet using a router 20 and/or a modem 22, although many other types of network connections are possible.

Referring now to FIG. 2, an exemplary AP 14 for a WLAN device includes a media access control (MAC) device 24, a baseband processor (BBP) 26, a radio frequency (RF) transceiver 28, and a crystal oscillator (XOSC) 30. The AP 14 may include a system on chip (SOC) 32 that includes the MAC device 24, the BBP 26, and other SOC components 34. For example, the other SOC components 34 may include a host interface 36, a processor 38, and memory 40. Typically, the RF transceiver 28 and the XOSC 30 are located external to the SOC 32. In another implementation, an amplifier portion of the XOSC 30 is integrated with the SOC 32 and a crystal portion of the XOSC 30 is located external to the SOC 32. In another implementation, the RF transceiver is integrated with the SOC 32.

The RF transceiver 28 wirelessly transmits/receives data to/from client stations in the wireless LAN. The RF transceiver 28 includes a phase-locked loop (PLL) 42 that receives a reference signal from the XOSC 30. The PLL 42 generates a clock signal based on the reference signal from the XOSC 30. The RF transceiver 28 includes a transmitter 44 and a receiver 46.

The BBP 26 modulates/demodulates signals between the RF transceiver 28 and the MAC device 24. The BBP 26 includes an analog to digital converter (ADC) 50, a digital to analog converter (DAC) 52, a demodulator 54, and a modulator 56. The ADC 50 receives signals from the receiver 46. The ADC 50 communicates with the demodulator 54, which demodulates the signals. A MAC interface 58 communicates with the MAC device 24. Conversely, the MAC device 24 sends signals to the MAC interface 58. The modulator 56 modulates the signals from the MAC device 24 and the DAC 52 outputs signals to the transmitter 44.

An AP in a wireless network transmits a beacon at a target beacon transmission time (TBTT). The TBTT time functions in conjunction with a timing synchronization function (TSF) timer to synchronize the AP and the client stations in the wireless network. The AP and all of the client stations in the wireless network include a TSF timer.

Referring now to FIG. 3, the AP periodically transmits an exemplary beacon frame 60 at a TBTT. The beacon frame 60 includes a TSF time 61 and a beacon interval 62. The TSF time 61 is a time according to the AP's TSF timer when the beacon frame 60 is sent. The beacon interval 62 is a time between each TBTT. The client stations receive the beacon frame 62 and operate according to the information contained therein. Each client station updates its own TSF timer according to the TSF time 61. Further, the beacon interval 62 indicates future TBTTs to the client stations. In this manner, the AP maintains synchronization in the wireless network.

In some types of networks, all of the client stations need to transmit data regularly, for example, at each beacon interval. One example of this type of network is a wireless console gaming application operating in an infrastructure mode.

Referring now to FIG. 4, a wireless gaming network 64 includes a host gaming device 66 and one or more client gaming devices 68. The client gaming devices 68 include wireless local area network (WLAN) hardware and operate as client stations in an infrastructure mode network. The host gaming device 66 also includes wireless LAN hardware and operates as an access point (AP) in the wireless gaming network. The wireless gaming network allows for greater mobility of the client gaming devices 68. Those skilled in the art can appreciate that the host gaming device 66 and the client gaming devices 68 may be a game console or any other suitable implementation of an AP and one or more wireless client stations. The host gaming device 66 synchronizes wireless communication with and between the client gaming devices 68 as described above in FIG. 3.

Further, the host gaming device 66 (and the AP 14 as described in FIGS. 1 and 2) and/or the client gaming devices 68 communicate on a particular RF channel. Although multiple RF channels may be available, a wireless network typically uses a single RF channel for transmitting and receiving data. Typically, the host gaming device 66 and/or the client gaming devices 68 transmit and receive data on an RF channel in the 2.4 gigahertz (GHz) band or the 5 GHz band.

SUMMARY

A wireless network device comprises a first wireless communication device that includes a first radio frequency (RF) transceiver that generates a synchronization pulse and that transmits and receives data according to a first period. A second wireless communication device receives a signal indicative of the synchronization pulse and includes a second RF transceiver that transmits and receives data according to a second period. The second period is not equal to the first period and the second wireless communication device adjusts the second period according to the first period and the synchronization pulse.

In other features of the invention, the second wireless communication device further adjusts the second period based on a desired phase. Adjusting the second period includes adjusting at least one of a length of the second period and a phase of the second period. The phase of the second period is adjusted based on a known phase offset from a phase of the first period. The first wireless communication device is a Bluetooth device. The second wireless communication device is an access point (AP) in a wireless LAN network. The first wireless communication device communicates with a first network including first client stations and the second wireless communication device communicates with a second network including second client stations.

In other features of the invention, the second period is adjusted to be equal to the first period. The second period is determined according to a timer value. The timer value is adjusted according to at least one of a difference between the first period and the second period and a phase difference between the first period and the second period. A beacon of a wireless LAN that includes the second wireless communication device includes a timing synchronization function (TSF) time that is based on the adjusted timer value. A wireless network comprises the wireless network device. The second wireless communication device is compliant with a protocol selected from a group consisting of IEEE standard 802.11, 802.11a, 802.11b, 802.11g, 802.11h, 802.11n, 802.16, and 802.20.

A wireless network device comprises a first wireless communication device that includes a first radio frequency (RF) transceiver that generates a synchronization pulse and that transmits and receives data according to a first period. A second wireless communication device receives a signal indicative of the synchronization pulse, includes a second RF transceiver that transmits and receives data according to a second period, and measures a value that is indicative of a duration of the second period. The second period is not equal to the first period, the second wireless communication device adjusts the value according to a difference between the first period and the second period, adjusts the second period according to the adjusted value, and the adjusted second period is substantially equal to the first period.

In other features of the invention, a phase of the adjusted second period is offset from a phase of the first period based on a desired phase offset. The first wireless communication device is a Bluetooth device. The second wireless communication device is an access point (AP) in a wireless LAN network. The first wireless communication device communicates with a first network including first client stations and the second wireless communication device communicates with a second network including second client stations. The second wireless communication device transmits a beacon that includes a timing synchronization function (TSF) time that is based on the adjusted value. A wireless network comprises the wireless network device. The second wireless communication device is compliant with a protocol selected from a group consisting of IEEE standard 802.11, 802.11a, 802.11b, 802.11g, 802.11h, 802.11n, 802.16, and 802.20.

A wireless network device comprises a radio frequency (RF) transceiver that transmits and receives data according to a first period. A media access control device communicates with the RF transceiver and includes a timer that determines the first period. A timer adjustment module receives a signal indicative of the first period and a signal indicative of a second period that is not equal to the first period, determines a difference between the first period and the second period, and adjusts the timer according to the difference.

In other features of the invention, the timer adjustment module further determines a difference between a phase of the first period and a phase of the second period and further adjusts the timer according to the difference between the phases. The wireless network device is an access point (AP) in a wireless LAN network. The timer is a timing synchronization function (TSF) timer. The wireless network device at least one of transmits and receives a beacon that includes a TSF time that is based on the adjusted timer. The first period is a beacon interval. The second period is a Bluetooth period of a Bluetooth device.

In other features of the invention, a counter increments according to the first period. A comparator receives a first input from the timer and a second input from the counter and generates a signal indicative of the first period according to the first input and the second input. A phase detector receives a first signal that is indicative of the first period and a second signal that is indicative of the second period and generates a phase error signal that is indicative of a difference between a phase of the first period and a phase of the second period. The timer adjustment module adjusts the timer according to the phase error signal. The wireless network device communicates with a first network including first client stations according to the first period. A wireless network comprises the wireless network device. The wireless network device is compliant with a protocol selected from a group consisting of IEEE standard 802.11, 802.11a, 802.11b, 802.11g, 802.11h, 802.11n, 802.16, and 802.20.

A method for operating a wireless network comprises generating a synchronization pulse at a first wireless communication device, at least one of transmitting and receiving data according to the synchronization pulse and a first period at the first wireless communication device, receiving a signal indicative of the synchronization pulse at a second wireless communication device, and at least one of transmitting and receiving data according to a second period at the second wireless communication device, wherein the second period is not equal to the first period and the second wireless communication device adjusts the second period according to the first period and the synchronization pulse.

In other features of the invention, the method further comprises adjusting the second period based on a desired phase. Adjusting the second period includes adjusting at least one of a length of the second period and a phase of the second period. Adjusting the second period includes adjusting the phase of the second period based on a known phase offset from a phase of the first period. The first wireless communication device is a Bluetooth device. The second wireless communication device is an access point (AP) in a wireless LAN network. Adjusting the second period includes adjusting the second period to be equal to the first period.

In other features of the invention, the method further comprises determining the second period according to a timer value. The method further comprises adjusting the timer value according to at least one of a difference between the first period and the second period and a phase difference between the first period and the second period. The method further comprises transmitting a beacon that includes a timer value that is based on the adjusted timer value. The timer value is adjusted at a timer adjustment module. The second wireless communication device includes the timer adjustment module.

A wireless network device comprises first wireless communication means that includes first radio frequency (RF) transceiver means for generating a synchronization pulse and for transmitting and receiving data according to a first period. The wireless network device comprises second wireless communication means for receiving a signal indicative of the synchronization pulse and includes a second RF transceiver means for transmitting and receiving data according to a second period. The second period is not equal to the first period and the second wireless communication means adjusts the second period according to the first period and the synchronization pulse.

In other features of the invention, the second wireless communication means further adjusts the second period based on a desired phase. Adjusting the second period includes adjusting at least one of a length of the second period and a phase of the second period. The phase of the second period is adjusted based on a known phase offset from a phase of the first period. The first wireless communication means is a Bluetooth device. The second wireless communication means is an access point (AP) in a wireless LAN network. The first wireless communication means communicates with a first network including first client stations and the second wireless communication device communicates with a second network including second client stations.

In other features of the invention, the second period is adjusted to be equal to the first period. The second period is determined according to a timer value. The timer value is adjusted according to at least one of a difference between the first period and the second period and a phase difference between the first period and the second period. A beacon of a wireless LAN that includes the second wireless communication means includes a timing synchronization function (TSF) time that is based on the adjusted timer value. A wireless network comprises the wireless network device. The second wireless communication means is compliant with a protocol selected from a group consisting of IEEE standard 802.11, 802.11a, 802.11b, 802.11g, 802.11h, 802.11n, 802.16, and 802.20.

A wireless network device comprises a first wireless communication means that includes a first radio frequency (RF) means for generating a synchronization pulse and for transmitting and receiving data according to a first period. The wireless network device comprises second wireless communication means for receiving a signal indicative of the synchronization pulse, for including second RF transceiver means for transmitting and receiving data according to a second period, and for measuring a value that is indicative of a duration of the second period. The second period is not equal to the first period, the second wireless communication means adjusts the value according to a difference between the first period and the second period, adjusts the second period according to the adjusted value, and the adjusted second period is substantially equal to the first period.

In other features of the invention, a phase of the adjusted second period is offset from a phase of the first period based on a desired phase offset. The first wireless communication means is a Bluetooth device. The second wireless communication means is an access point (AP) in a wireless LAN network. The first wireless communication means communicates with a first network including first client stations and the second wireless communication means communicates with a second network including second client stations. The second wireless communication means transmits a beacon that includes a timing synchronization function (TSF) time that is based on the adjusted value. A wireless network comprises the wireless network device. The second wireless communication means is compliant with a protocol selected from a group consisting of IEEE standard 802.11, 802.11a, 802.11b, 802.11g, 802.11h, 802.11n, 802.16, and 802.20.

A wireless network device comprises radio frequency (RF) transceiver means for transmitting and receiving data according to a first period. The wireless network device includes media access control means for communicating with the RF transceiver and includes timer means for determining the first period. The wireless network device comprises timer adjustment means for receiving a signal indicative of the first period and a signal indicative of a second period that is not equal to the first period, for determining a difference between the first period and the second period, and for adjusting the timer means according to the difference.

In other features of the invention, the timer adjustment means further determines a difference between a phase of the first period and a phase of the second period and further adjusts the timer means according to the difference between the phases. The wireless network device is an access point (AP) in a wireless LAN network. The timer means is a timing synchronization function (TSF) timer. The wireless network device at least one of transmits and receives a beacon that includes a TSF time that is based on the adjusted timer means. The first period is a beacon interval. The second period is a Bluetooth period of a Bluetooth device.

In other features of the invention, the wireless network device comprises counter means for incrementing a value according to the first period. The wireless network means includes comparator means for receiving a first input from the timer means and a second input from the counter means and for generating a signal indicative of the first period according to the first input and the second input. The wireless network device comprises phase detector means for receiving a first signal that is indicative of the first period and a second signal that is indicative of the second period and for generating a phase error signal that is indicative of a difference between a phase of the first period and a phase of the second period. The timer adjustment means adjusts the timer means according to the phase error signal. The wireless network device communicates with a first network including first client stations according to the first period. A wireless network comprises the wireless network device. The wireless network device is compliant with a protocol selected from a group consisting of IEEE standard 802.11, 802.11a, 802.11b, 802.11g, 802.11h, 802.11n, 802.16, and 802.20.

A computer program stored for use by a processor for operating a wireless network comprises generating a synchronization pulse at a first wireless communication device, at least one of transmitting and receiving data according to the synchronization pulse and a first period at the first wireless communication device, receiving a signal indicative of the synchronization pulse at a second wireless communication device, and at least one of transmitting and receiving data according to a second period at the second wireless communication device, wherein the second period is not equal to the first period and the second wireless communication device adjusts the second period according to the first period and the synchronization pulse.

In other features of the invention, the computer program further comprises adjusting the second period based on a desired phase. Adjusting the second period includes adjusting at least one of a length of the second period and a phase of the second period. Adjusting the second period includes adjusting the phase of the second period based on a known phase offset from a phase of the first period. The first wireless communication device is a Bluetooth device. The second wireless communication device is an access point (AP) in a wireless LAN network. Adjusting the second period includes adjusting the second period to be equal to the first period.

In other features of the invention, the computer program further comprises determining the second period according to a timer value. The computer program further comprises adjusting the timer value according to at least one of a difference between the first period and the second period and a phase difference between the first period and the second period. The computer program further comprises transmitting a beacon that includes a timer value that is based on the adjusted timer value. The timer value is adjusted at a timer adjustment module. The second wireless communication device includes the timer adjustment module.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present invention will become more fully understood from the detailed description and the accompanying drawings, wherein:

FIG. 3 is an exemplary beacon frame according to the prior art;

FIG. 4 is a functional block diagram of a wireless gaming network according to the prior art;

FIG. 7 is a timing diagram that illustrates Bluetooth traffic intervals according to the prior art;

FIG. 8 is a timing diagram that illustrates wireless LAN traffic intervals according to the prior art;

DETAILED DESCRIPTION OF THE PREFERRED EMBODIMENTS

Figure 1:
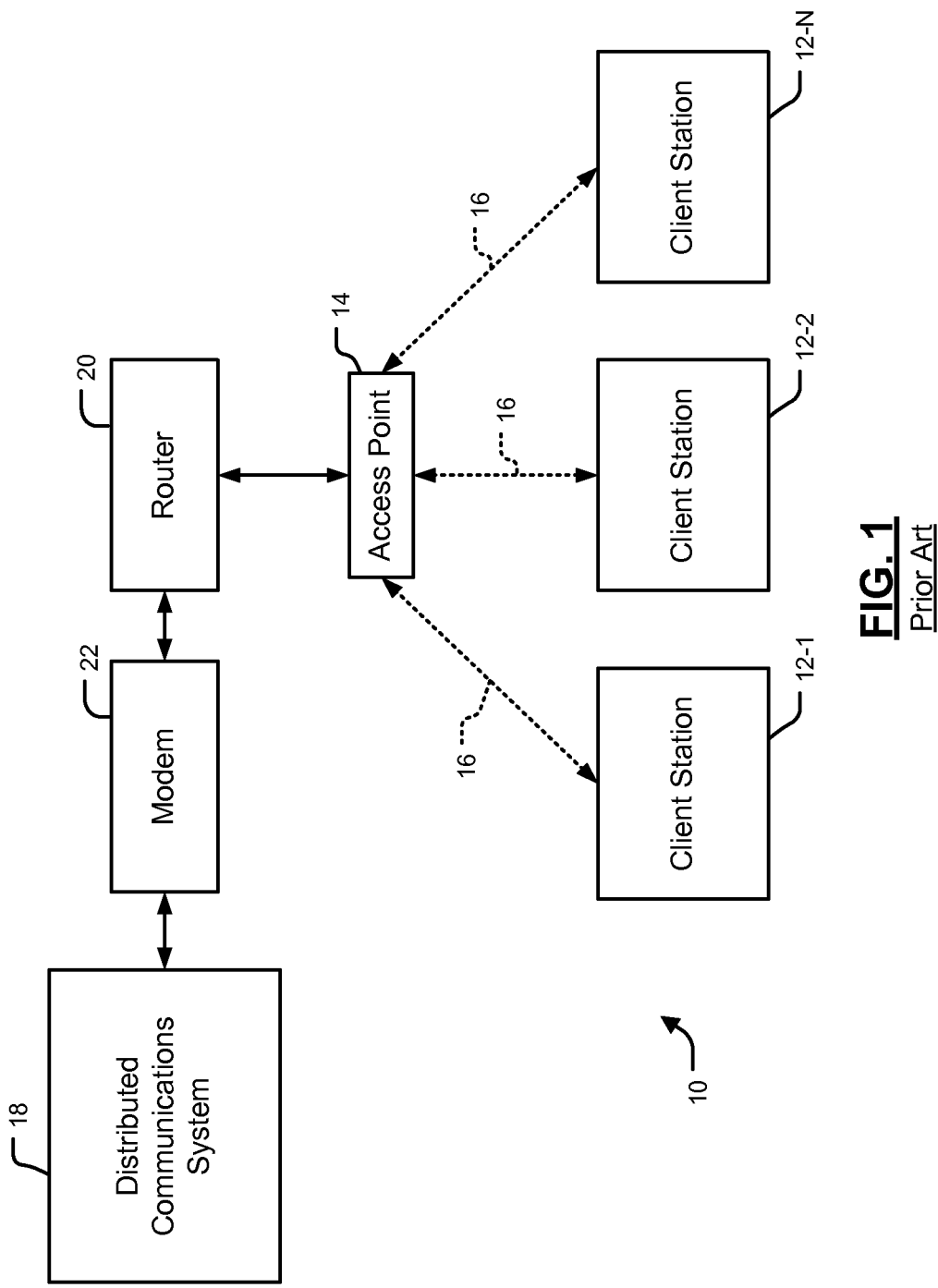
FIG. 1 is a functional block diagram of a wireless network that operates in an infrastructure mode according to the prior art.
Figure 2:
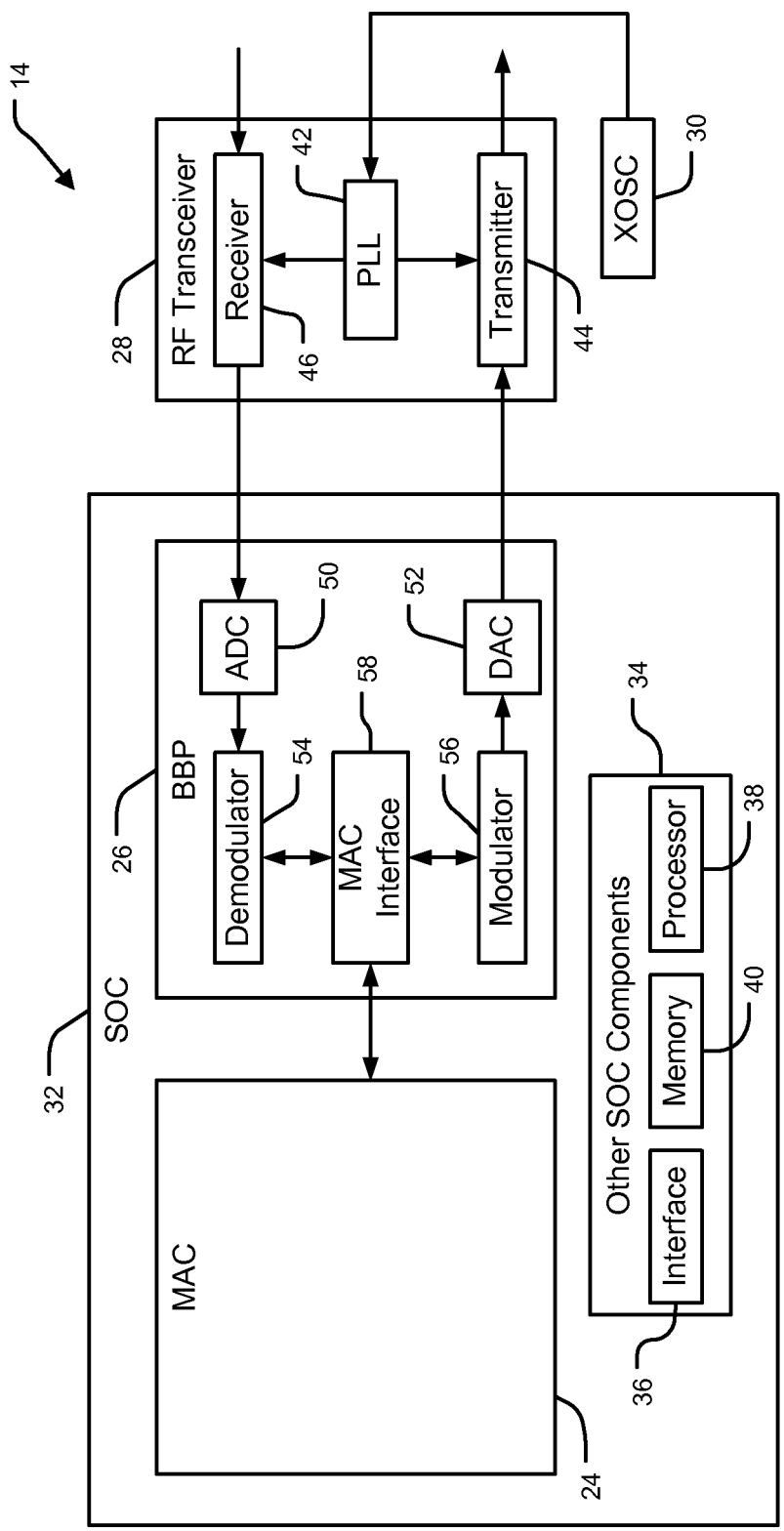
FIG. 2 is a functional block diagram of an access point for a wireless network device according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present invention.

The WLAN according to the present invention allows a WLAN device to share the 2.4 GHz band with a device that operates according to Bluetooth technology (i.e. a Bluetooth device). Bluetooth devices support short-range wireless communications in the 2.4 GHz band. A wireless network device according to the present invention synchronizes the WLAN device and the Bluetooth device as will be described below.

Figure 5:
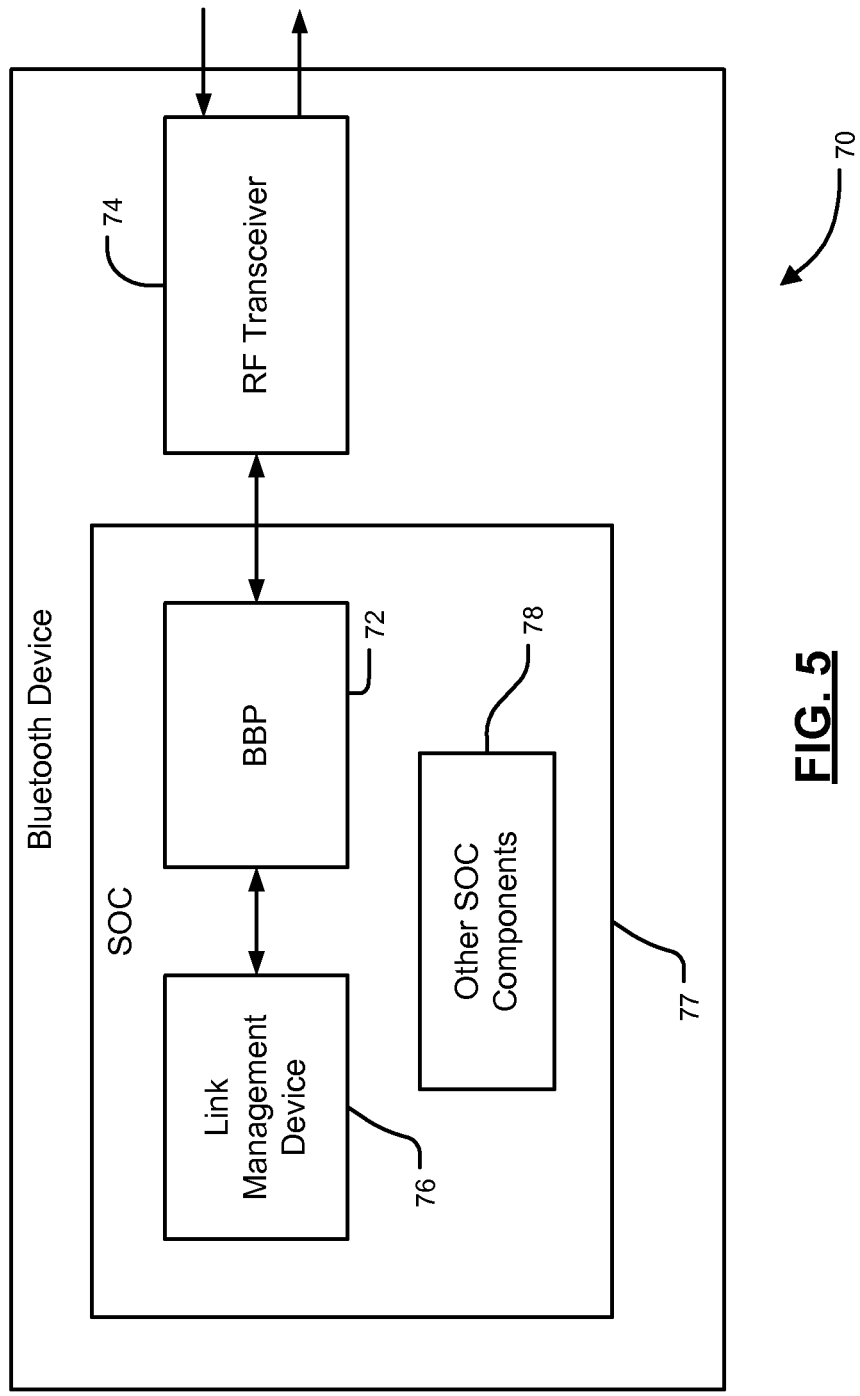
FIG. 5 is a functional block diagram of a Bluetooth device according to the prior art.

Referring now to FIG. 5, an exemplary Bluetooth device 70 operates according to a Bluetooth specification. For example, the Bluetooth device 70 may operate according to an IEEE standard for configuring wireless personal area networks (WPAN), such as IEEE §802.15.1, which is hereby incorporated by reference in its entirety. A typical Bluetooth device 70 includes a baseband processor (BBP) 72, a radio frequency (RF) transceiver 74, and a link management device 76. The Bluetooth device 70 may include a system on chip (SOC) 77 that includes the BBP 72, the link management device 76, and other SOC components, identified collectively at 78, including interfaces, memory, and/or processors (not shown). The radio frequency (RF) transceiver 74 transmits/receives data to/from client stations in a Bluetooth wireless network.

Figure 6:
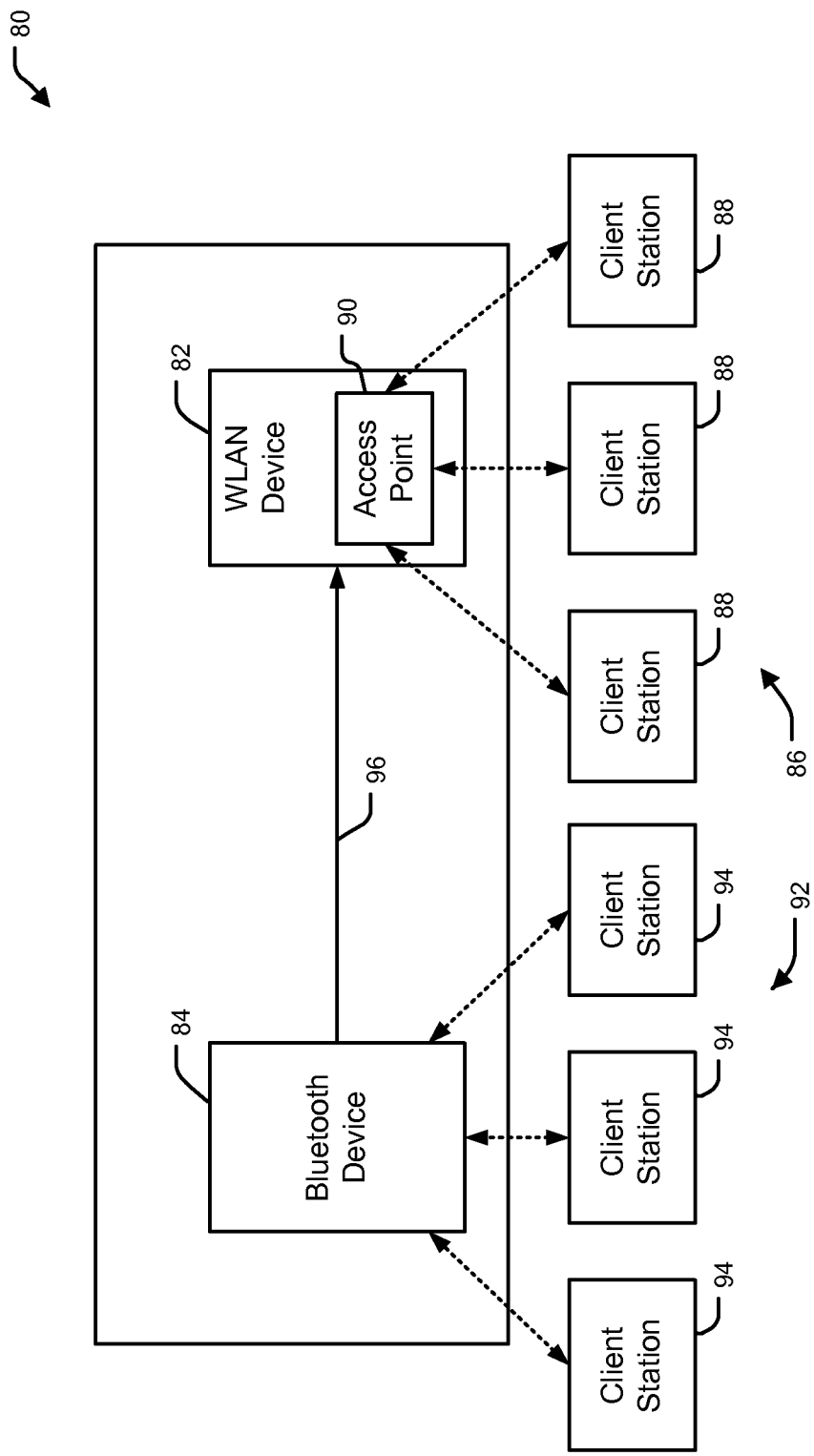
FIG. 6 is a functional block diagram of a Bluetooth-synchronized wireless network device according to the present invention.

Referring now to FIG. 6, a Bluetooth-synchronized wireless network device 80 includes a WLAN device 82 and a Bluetooth device 84. The WLAN device 82 establishes a network 86 of WLAN client stations 88 as described above. For example, the WLAN client stations 88 may include a network of client gaming devices as described in FIG. 4. The WLAN device 82 includes an AP 90 that communicates with the WLAN client stations 88.

Similarly, the Bluetooth device 84 establishes a network 92 of Bluetooth (BT) client stations 94. For example, the BT client stations 94 may include a network of game controllers and/or other input devices for the WLAN client stations 88. The BT client stations 94 communicate with the BT device 84 at regular intervals according to BT synchronization (sync) pulses.

The BT device 84 outputs a synchronization signal 96 to the WLAN device 82. The synchronization signal 96 is indicative of the timing of the BT traffic. In other words, the BT device 84 transmits the synchronization signal 96 to the WLAN device 82 prior to the start of data transmission between the BT device 84 and the BT client stations 94. Therefore, the WLAN device 82 is able to predict when BT traffic will occur according to the BT sync pulses and the ensuing BT period. The WLAN device 82 synchronizes communications with the WLAN client stations 88 according to the BT sync pulses. In this manner, the WLAN device 82 ensures that communication in the BT network 92 is synchronized with communication in the WLAN network 86.

A length of the BT period is determined according to a number of BT client stations 94 in the network 92. The BT period is comprised of a plurality of time slots. Typically, a single BT client station 94 is allotted a time slot of approximately 625 microseconds (μs) to transmit, and 625 μs to receive. Therefore, each BT client station 94 requires 2 time slots. In other circumstances, a BT client station 94 may require more than 2 time slots. For example, a new BT client station 94 may require 6 time slots to establish contact with the BT device 84 and join the network 92.

The BT period is n*625 μs, where n is the number of time slots. For example, when there are 18 time slots, the BT period is 18*625 μs, or 11250 μs (11.25 milliseconds). Although other time slot lengths can be used, a time slot of 625 μs will be assumed for discussion purposes. Similarly, although any number of BT client stations 94 and/or time slots can be used, 18 time slots per BT period are assumed for purposes of discussion. However, those skilled in the art can appreciate from the foregoing that the BT period will be a multiple of time slot length, regardless of time slot length and/or the number of time slots.

Referring now to FIG. 7, a BT synchronization timing diagram 100 is shown. A BT sync pulse 102 occurs at 18*625 μs, or 11250 μs, intervals. A BT period 104 of 11250 μs follows the BT sync pulse 102.

As described above, the AP 90 of the WLAN device 82 receives each BT sync pulse. The AP 90 of the WLAN device 82, therefore, synchronizes communication with the WLAN client stations 88 so that a period between TBTTs is, on average, the same length as the BT period. In other words, the AP 90 should transmit the beacon according to a TBTT that coincides with the BT period. High priority WLAN traffic (i.e. communication in the WLAN network 86) would subsequently follow the beacon, prior to a next BT sync pulse.

Typically, a TBTT is comprised of a multiple of 1024 μs, or m*1024 μs. In other words, the WLAN client stations 88 operate according to a TBTT of m*1024 μs. The beacon includes data that informs the WLAN client stations 88 of the multiple m, and the WLAN client stations 88 wait m*1024 μs before receiving the subsequent beacon, according to each client station's TSF timer.

Referring now to FIG. 8, a WLAN synchronization timing diagram 110 is shown. Beacons 112 are transmitted at a TBTT 114 that is a multiple of 1024 μs, or m*1024 μs, after a previous TBTT. A WLAN beacon interval 116 of m*1024 μs is in the interval between TBTTs.

A common relationship does not exist between the 625 μs BT multiple and the 1024 μs WLAN multiple. Further, The WLAN client stations 88 are frequently enter a sleep state during beacon intervals and set a timer to wake up prior to a subsequent beacon. For example, when the BT period is 11250 μs, the closest possible WLAN multiple is 11*1024 μs, or 11264 μs. First and second BT sync pulses would occur at 11250 μs and 22500 μs, respectively. In contrast, first and second WLAN beacons would occur at 11264 μs and 22528 μs, respectively. As such, the BT periods and the WLAN beacon intervals would be asynchronous. The difference in time periods results in WLAN TBTTs that occur during BT traffic times when the WLAN is not allowed to transmit. Consequently, the WLAN client stations 88 remain awake for longer periods of time and consume additional power.

Figure 9:
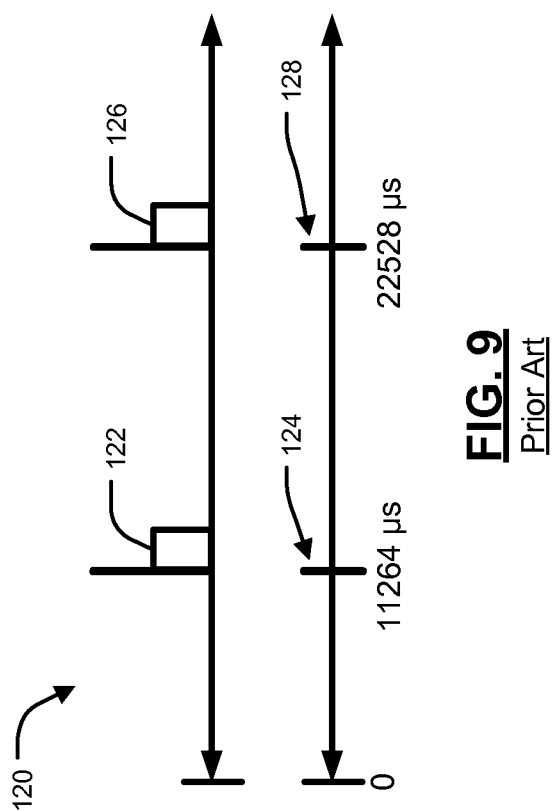
FIG. 9 is a timing diagram that illustrates a TSF timer according to the prior art.

Referring now to FIG. 9, a TSF timing diagram 120 according to the prior art is shown. A TSF timer is incremented by 1 at 1 μs intervals. The WLAN AP 90 monitors its TSF timer to determine when to transmit the beacon to the WLAN client stations 88. For example, when the TBTT is 11*1024 μs, or 11264 μs, the WLAN AP 90 transmits a first beacon 122 shortly after the TSF timer is at 11264 us as indicated at 124. The WLAN AP 90 transmits a second beacon 126 shortly after the TSF timer is at 22528 μs as indicated at 128. The WLAN client stations 88 adopt the TSF time that is embedded into the beacon by the WLAN AP 90, and use this value to predict the next TBTT. In other words, the value of the TSF timer dictates the timing of the WLAN client stations 88.

The present invention dynamically adjusts the TSF timer of the AP 90 to compensate for the disparity between the BT periods and the WLAN beacon intervals. More specifically, the TSF timer of the AP 90 is adjusted by a synchronization offset so that the WLAN client stations 88 operate according to a TBTT that is slightly higher or lower than a multiple of 1024 μs.

Figure 10:
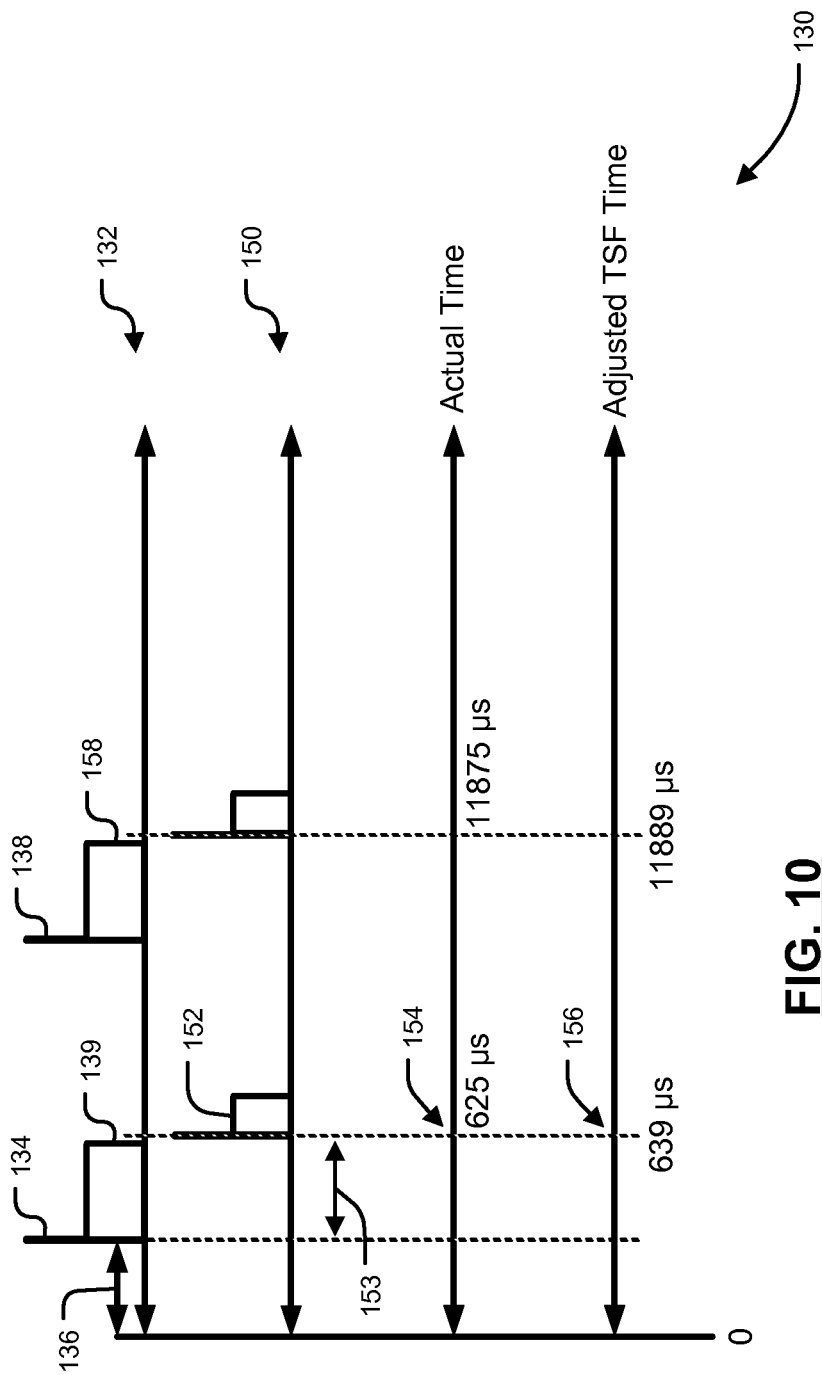
FIG. 10 is timing diagram that illustrates Bluetooth synchronization according to the present invention.

Referring now to FIG. 10, a BT-synchronized WLAN timing diagram 130 is shown. BT timing is illustrated at 132. The BT device generates a first BT sync pulse 134 as described above in FIG. 6. In the present example, the BT device generates the first BT sync pulse 134 at 625 μs to allow an initial offset time 136 of one BT time slot, or 625 μs. The BT time slot of 625 μs is exemplary and may vary according to a duration of BT traffic. The BT device generates a second BT sync pulse 138 at 11250 μs after the first BT sync pulse 134, or at 11875 μs. BT traffic follows the BT sync pulse 134 in a first BT sync period 139.

WLAN timing is illustrated at 150. The WLAN AP transmits a first beacon 152 following a TBTT that coincides with the end of the first BT sync period 139 at 625 μs. In other words, the TBTT is offset from the BT sync pulse 134 based on a desired phase 153. At this time, the TSF timers for the AP and the WLAN client stations would be storing a TSF time of 625 μs. However, a TSF time included in the first beacon 152 replaces the TSF times of each WLAN client station. The first beacon 152 includes a TSF time of 639 μs, or 624+14 μs. In other words, the TSF time in the first beacon 152 forces the TSF times of the WLAN client stations to advance by a TSF adjustment factor of 14 μs. While an actual time is 625 μs as indicated at 154, the TSF time is 639 μs as indicated at 156.

The first beacon 152 also includes a TBTT of 11*1024 μs, or 11264 μs. In this manner, the WLAN client stations are instructed to wait a TBTT of 11264 μs, or 11264 μs after the current actual time of 625 μs. Therefore, the WLAN client stations expect the next beacon at a TSF time of 11889 μs. However, because the TSF timers of the WLAN client stations are advanced by 14 μs, the TSF time of 11889 μs corresponds to an actual time of 11875 μs, or a time after a second BT sync period 158.

As can be understood from the foregoing, each beacon adds a TSF adjustment factor to the current TSF time to advance the TSF timers of the WLAN client stations. In this manner, the TSF timers are dynamically updated to maintain synchronization between the BT periods and the WLAN beacon intervals. Alternatively, a WLAN multiple m that would result in an initial TBTT time that is slightly less than the BT period may be selected. In other words, the TSF adjustment factor could be a negative value that causes the TSF timers to subtract time, rather than add time.

Typically, the WLAN device and the BT device operate according to different clock frequencies. For example, the WLAN device may operate according to a 40 MHz clock signal and the BT device may operate according to a 24 MHz clock signal. Those skilled in the art can appreciate that other suitable clock signal frequencies are possible. As such, the difference between the WLAN device clock signal and the BT device clock signal results in a phase disparity.

Figure 11:
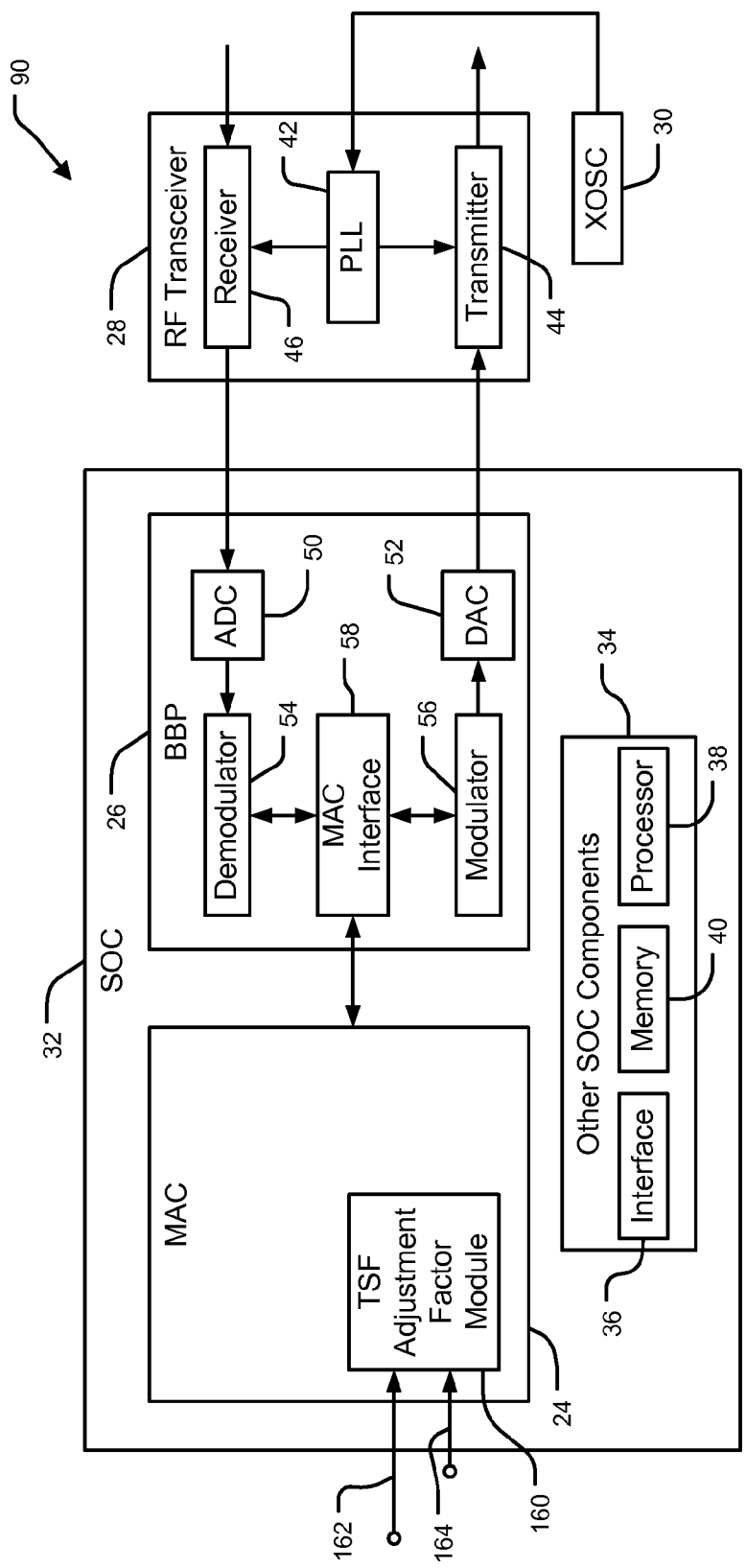
FIG. 11 is a functional block diagram of an access point according to the present invention.

Referring now to FIG. 11, the WLAN AP 90 includes a TSF adjustment factor module 160. The TSF adjustment factor module 160 receives a BT sync pulse 162 and a TBTT pulse 164 that are indicative of the BT period and the WLAN beacon interval, respectively. The TSF adjustment factor module 160 dynamically determines a phase error according to the BT sync pulse and the TBTT pulse 164 and calculates a TSF adjustment factor accordingly. In other words, the TSF adjustment factor is not necessarily a fixed value, such as 14 µs. The TSF adjustment factor module 160 dynamically calculates the value of the TSF adjustment factor at each TBTT.

Figure 12:
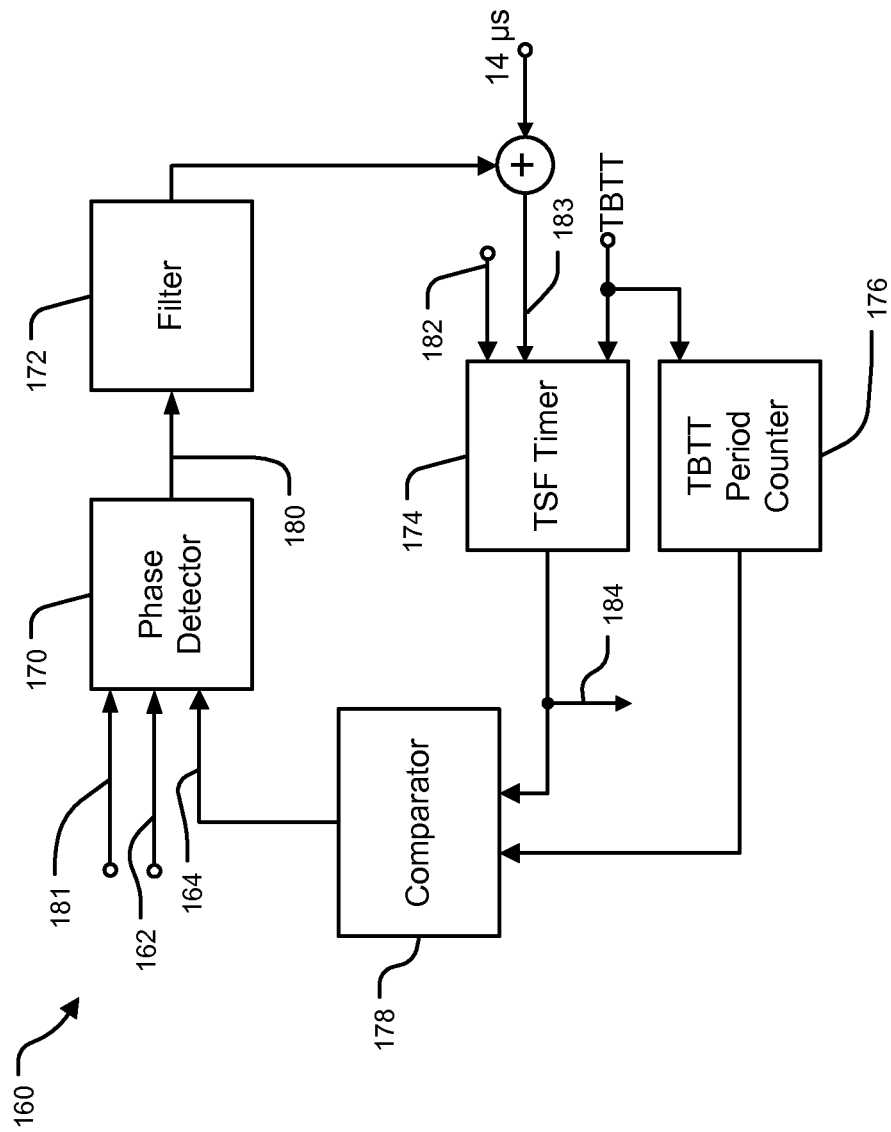
FIG. 12 is a functional block diagram of a TSF adjustment factor module according to the present invention.

Referring now to FIG. 12, the TSF adjustment factor module 160 includes a phase detector 170, a filter 172, a TSF timer 174, a TBTT period counter 176, and a comparator 178. A phase error 180 between the BT sync pulse 162 and the TBTT pulse 164 is input through the filter 172 and to the TSF timer 174. The phase detector 170 may also receive a desired phase signal 181. The TSF timer 174 is a 1 µs counter that increments by 1 every 1 µs according to a 1 µs clock 182. Additionally, the TSF timer 174 increments according to a TSF adjustment factor 183 at each TBTT. The TSF adjustment factor 183 is a combination of both the phase error 180 and a pre-programmed value, such as 14 µs. For example, the pre-programmed value may be stored in memory. In other words, the TSF timer 174 continuously increments by 1 µs and periodically increments (or decrements) according to the TSF adjustment factor 183. The TSF timer 174 outputs a TSF time 184 accordingly.

Further, the TSF adjustment factor module functions as a phase locked loop with the TSF timer 174 acting as a voltage controlled oscillator (VCO). The TBTT period counter 176 increments by a value that is equivalent to the TBTT multiple, or m*1024 µs. For example, the TBTT period counter 176 increments by 11*1024, or 11264 µs, at each TBTT. In other words, at each TBTT, the TSF timer 174 is adjusted and the TBTT period counter 176 outputs a value that is equivalent to a next TBTT. The outputs of the TSF timer 174 and the TBTT period counter 176 are input to the comparator 178. When the output of the TSF timer 174 reaches the value of the TBTT period counter (i.e. when the TSF timer 176 reaches the next TBTT), the comparator 178 outputs the next TBTT pulse 164.

Although the foregoing describes a wireless network device that includes a WLAN device and a Bluetooth device, any combination of devices may be used. For example, the present invention may be used to synchronize any two devices that transmit in a periodic fashion as described.

Figure 13B:
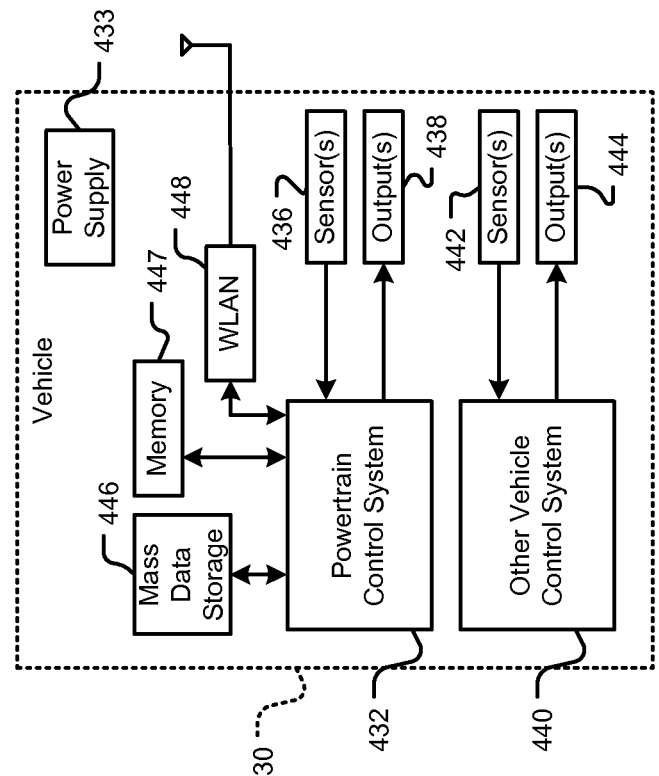
FIG. 13B is a functional block diagram of a vehicle control system.
Figure 13A:
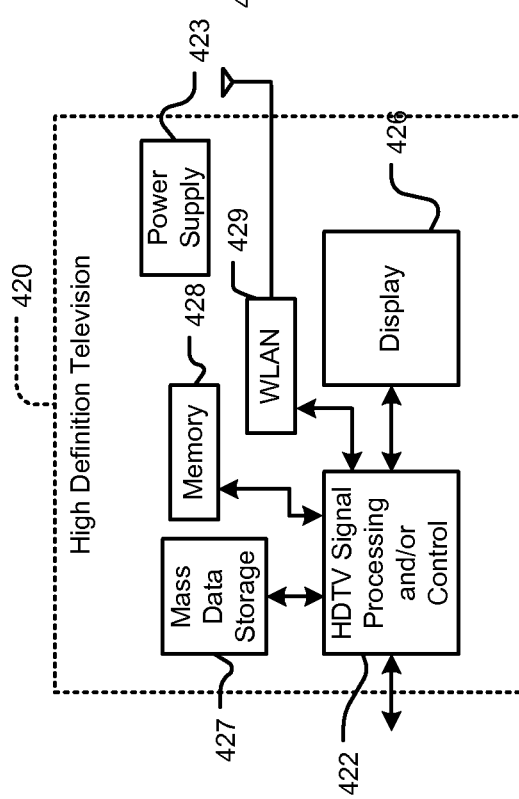
FIG. 13A is a functional block diagram of a high definition television.

Referring now to FIGS. 13A-13D, various exemplary implementations of the present invention are shown. Referring now to FIG. 13A, the present invention can be implemented in a high definition television (HDTV) 420 that includes signal processing and/or control circuits, which are generally identified in FIG. 13A at 422, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. For example, storage devices may include, but are not limited to, a hard disk drive (HDD) and/or a digital versatile disk (DVD). The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429. The present invention may implement or be implemented in the WLAN network interface 429.

Referring now to FIG. 13B, the present invention may implement and/or be implemented in a WLAN interface of a vehicle. The vehicle 430 includes a control system, a WLAN interface, mass data storage of the vehicle control system and/or a power supply 433. The powertrain control system 432 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 440 may receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN network interface 448. The control system 440 may also include mass data storage, memory and/or a WLAN interface (all not shown).

Figure 13C:
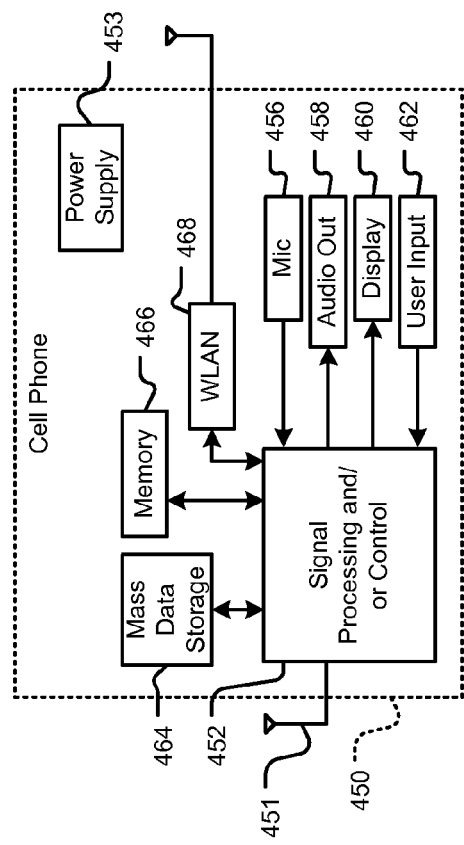
FIG. 13C is a functional block diagram of a cellular phone.

Referring now to FIG. 13C, the present invention can be implemented in a cellular phone 450 that may include a cellular antenna 451, signal processing and/or control circuits, which are generally identified in FIG. 13C at 452, a WLAN interface, mass data storage of the cellular phone 450 and/or a power supply 453. The present invention may implement or be implemented in the WLAN interface. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN network interface 468.

Figure 13D:
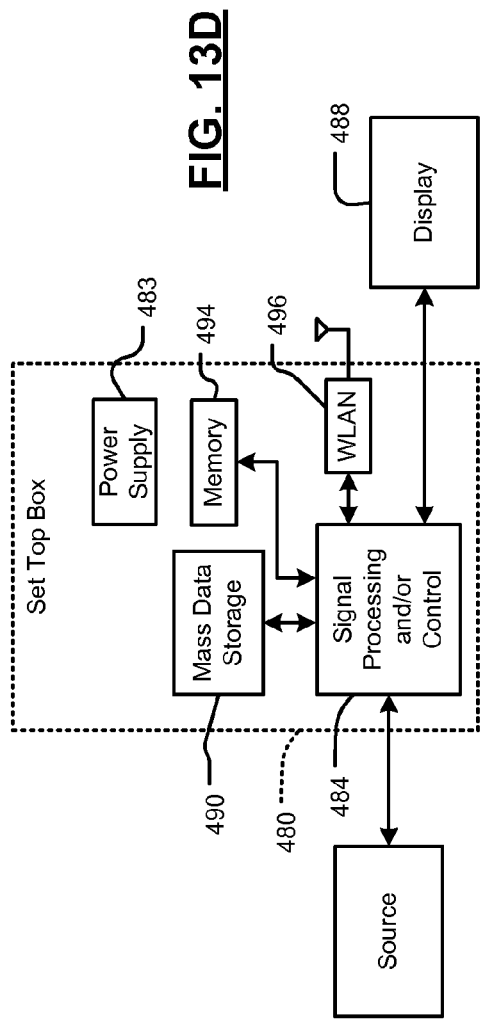
FIG. 13D is a functional block diagram of a set top box.

Referring now to FIG. 13D, the present invention can be implemented in a set top box 480 that includes signal processing and/or control circuits, which are generally identified in FIG. 13D at 484, a WLAN interface, mass data storage of the set top box 480 and/or a power supply 483. The present invention may implement or be implemented in the WLAN interface. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. Still other implementations in addition to those described above are contemplated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A Bluetooth device, comprising:
    a radio frequency transceiver configured to operate in a Bluetooth network, the radio frequency transceiver configured to communicate, with a first network of client stations in the Bluetooth network, according to a first period that is defined by a synchronization signal, wherein the synchronization signal is transmitted prior to a start of data transmission in the Bluetooth network; and
    an access point configured to operate in a wireless local area network, the access point configured to receive the synchronization signal,
    determine a second period that is based in part on the first period, and communicate with a second network of client stations according to the second period;
    wherein the access point is configured to adjust communication timing of the second network of client stations based on a multiple of a length of a single time slot of the first period.

2. The Bluetooth device of claim 1, wherein the synchronization signal includes a synchronization pulse followed by the first period.

3. The Bluetooth device of claim 1, wherein the access point is configured to communicate with the second network of client stations between consecutive synchronization pulses of the synchronization signal.

4. The Bluetooth device of claim 1, wherein the access point is configured to transmit a beacon to the second network of client stations in response to receiving the synchronization signal.

5. The Bluetooth device of claim 1, wherein a length of the first period is based on a number of client stations in the first network client stations.

6. The Bluetooth device of claim 1, wherein the first period includes a plurality of timeslots each corresponding to a respective client station in the first network of client stations.

7. The Bluetooth device of claim 1, wherein the access point is configured to adjust, based on the first period and the synchronization signal, at least one of i) a length of the second period and ii) a phase of the second period.

8. The Bluetooth device of claim 1, wherein the access point is configured to adjust communication timing of the second network of client stations based on the first period.

9. A method of operating a Bluetooth device, the method comprising:
    using a radio frequency transceiver configured to operate in a Bluetooth network,
    communicating, with a first network of client stations in the Bluetooth network, according to a first period that is defined by a synchronization signal,
    wherein the synchronization signal is transmitted prior to a start of data transmission in the Bluetooth network; and
    using an access point configured to operate in a wireless local area network,
    receiving the synchronization signal,
    determining a second period that is based in part on the first period, and
    communicating with a second network of client stations according to the second period;
    wherein the access point is configured to adjust communication timing of the second network of client stations based on a multiple of a length of a single time slot of the first period.

10. The method of claim 9, wherein the synchronization signal includes a synchronization pulse followed by the first period.

11. The method of claim 9, further comprising communicating with the second network of client stations between consecutive synchronization pulses of the synchronization signal.

12. The method of claim 9, further comprising transmitting a beacon to the second network of client stations in response to receiving the synchronization signal.

13. The method of claim 9, wherein a length of the first period is based on a number of client stations in the first network client stations.

14. The method of claim 9, wherein the first period includes a plurality of timeslots each corresponding to a respective client station in the first network of client stations.

15. The method of claim 9, further comprising adjusting, based on the first period and the synchronization signal, at least one of i) a length of the second period and ii) a phase of the second period.

16. The method of claim 9, further comprising adjusting communication timing of the second network of client stations based on the first period.

* * * * *